Dec. 20, 1966   R. T. FRANKLIN   3,292,493
CHAMFERING TOOL

Filed July 6, 1965   4 Sheets-Sheet 1

INVENTOR.
ROBERT T. FRANKLIN
BY
John H. Widdowson
ATTORNEY

Dec. 20, 1966  R. T. FRANKLIN  3,292,493
CHAMFERING TOOL

Filed July 6, 1965  4 Sheets-Sheet 3

INVENTOR.
ROBERT T. FRANKLIN
BY
John H. Widdowson
ATTORNEY

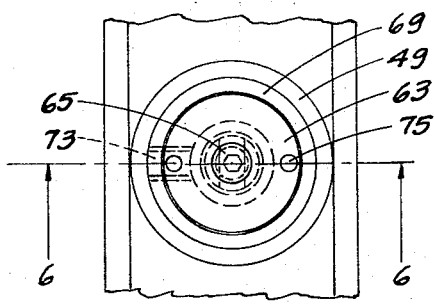
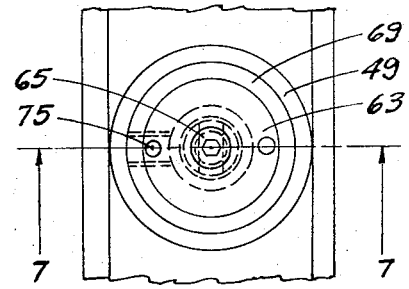
FIG. 4  FIG. 5
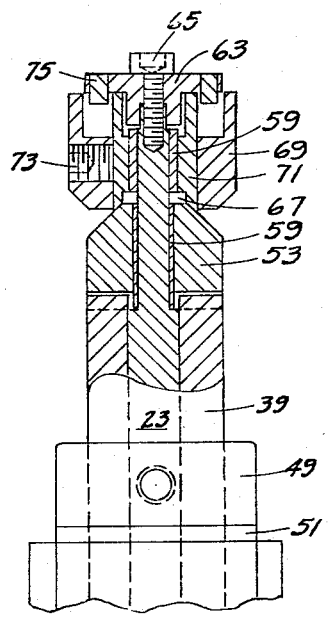
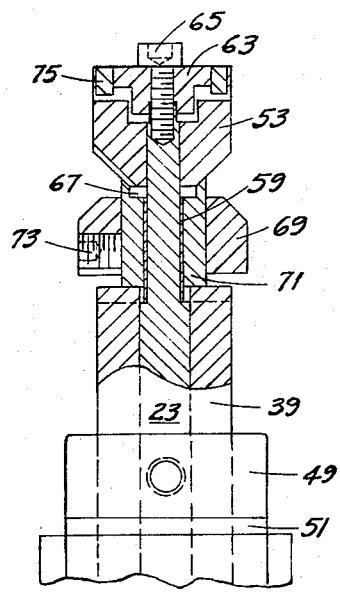
FIG. 6  FIG. 7

United States Patent Office 3,292,493
Patented Dec. 20, 1966

3,292,493
CHAMFERING TOOL
Robert T. Franklin, 1005 N. Market,
Wichita, Kans. 67211
Filed July 6, 1965, Ser. No. 469,634
9 Claims. (Cl. 90—11)

This invention relates to a chamfering tool, and more particularly this invention relates to a chamfering tool having adjacent cutter heads rotating in opposite directions. In a still more particular sense this invention relates to a portable chamfering tool that has shafts rotating in opposite directions with at least one of the shafts having a cutter head mounted thereon.

There are many tools and methods extant for chamfering, beveling or otherwise cutting material edges. The need for cutting such edges particularly on sheet metals is apparent to those familiar with sheet metal assembly and shop practice. One of the difficulties encountered in making a chamfering or beveling cut is the maintenance of a uniform surface the entire length of the cut. It is apparent that portable hand tools such as grinders and sanders cannot maintain a desired uniformity in the finished product.

In some applications it is possible to chamfer or bevel edges on stationary machines such as milling machines, lathes and the like. However, here again difficulties are encountered where the material to be chamfered does not have exact uniformity of shape or thickness. Where it is desirable to chamfer, for example, the cut-off end of a piece of tubing, the tubing is set up in a lathe chuck and a tool as passed over the edge of the tubing to chamfer same. However, if there is a slight distortion in the tubing so that it is not perfectly cylindrical, the chamfer will be of a varying thickness.

Great difficulty is encountered where it is desirable to chamfer an interior edge of a piece of tubing or an assembly. Where the assembly is too large to be placed on a milling machine or planer, lathe or the like, the only alternative is the use of a hand tool device which under present day tools and methods do not produce an entirely desirable result. Furthermore, the present day hand chamfering devices do not have means to adequately control the depth of the cut to achieve a uniform chamfer on a piece of material.

I have invented a new chamfering tool that has a housing, an input shaft and another shaft mounted in the housing for rotation therein. Gearing is mounted in the housing and drivingly connected to the shafts. The input shaft rotates in a direction opposite to the rotation of the outside shaft. A cutter is mounted on at least one of the shafts to make a uniform chamfer.

I have invented a light weight portable chamfering tool that overcomes the disadvantages of present day chamfering devices. My tool is small and compact and is adapted to be powered by any ordinary device such as an electric drill. It can also be mounted in a lathe chuck or drill press chuck and used as a stationary tool with the work being passed over it.

My tool invention is adaptable to all varieties of chamfering or edge cutting requirements. By changing the removable ends of the projecting shafts of my tool it is possible to chamfer an inside edge or an outside edge or two edges simultaneously.

The opposing directions of rotation of the heads on the ends of the shafts of my tool creates a no thrust condition that allows the tool to be operated easily by one operator. Uniformity of any cut is assured by the spacer rings and/or guide roller adaptation. By the same token the use of spacer rings provides a uniform cut on any ordinary thickness of material. My tool is also adapted to utilize many types of cutter heads to make cuts common to the art such as a bevel cut, a radius cut, a groove cut and so forth.

It is apparent to one skilled in the art that my invention would be particularly useful in cutting an edge on other than straight material such as round tubing or curved edges and the like on either the outside or the inside edge. In addition, my tool does not create the dust problem as created by many other methods of chamfering, such as sanding and grinding.

It is an object of this invention to provide a new chamfering tool.

It is another object of this invention to provide a new chamfering tool with cutter heads rotating in opposite directions.

Still another object of this invention is to provide a chamfering tool that is adapted to cut an inside or an outside chamfer or simultaneous chamfers.

It is yet another object of this invention to provide a chamfering tool that is light weight and portable.

One more object of this invention is to provide a chamfering tool that will cut a uniform bevel or the like.

And another object is to provide a chamfering tool that is dust free.

Various other objects, advantages, and features of the invention will become apparent to those skilled in the art from reading this disclosure.

Drawings accompany and are a part of this disclosure. These drawings depict preferred specific embodiments of the chamfering tool of the invention and it is to be understood that these drawings are not to unduly limit the scope of the invention. In the drawings, FIG. 1 is a longitudinal plan view of a preferred specific embodiment of my chamfering tool with the top cover removed therefrom.

FIG. 4 is an end view of the projecting shafts showing a preferred arrangement for beveling an outside edge.

FIG. 5 is an end view of the projecting shafts showing a preferred arrangement for beveling an inside edge.

FIG. 6 is a view taken along line 6—6 of FIG. 5.

FIG. 7 is a view taken along line 7—7 of FIG. 6.

Figure 1:
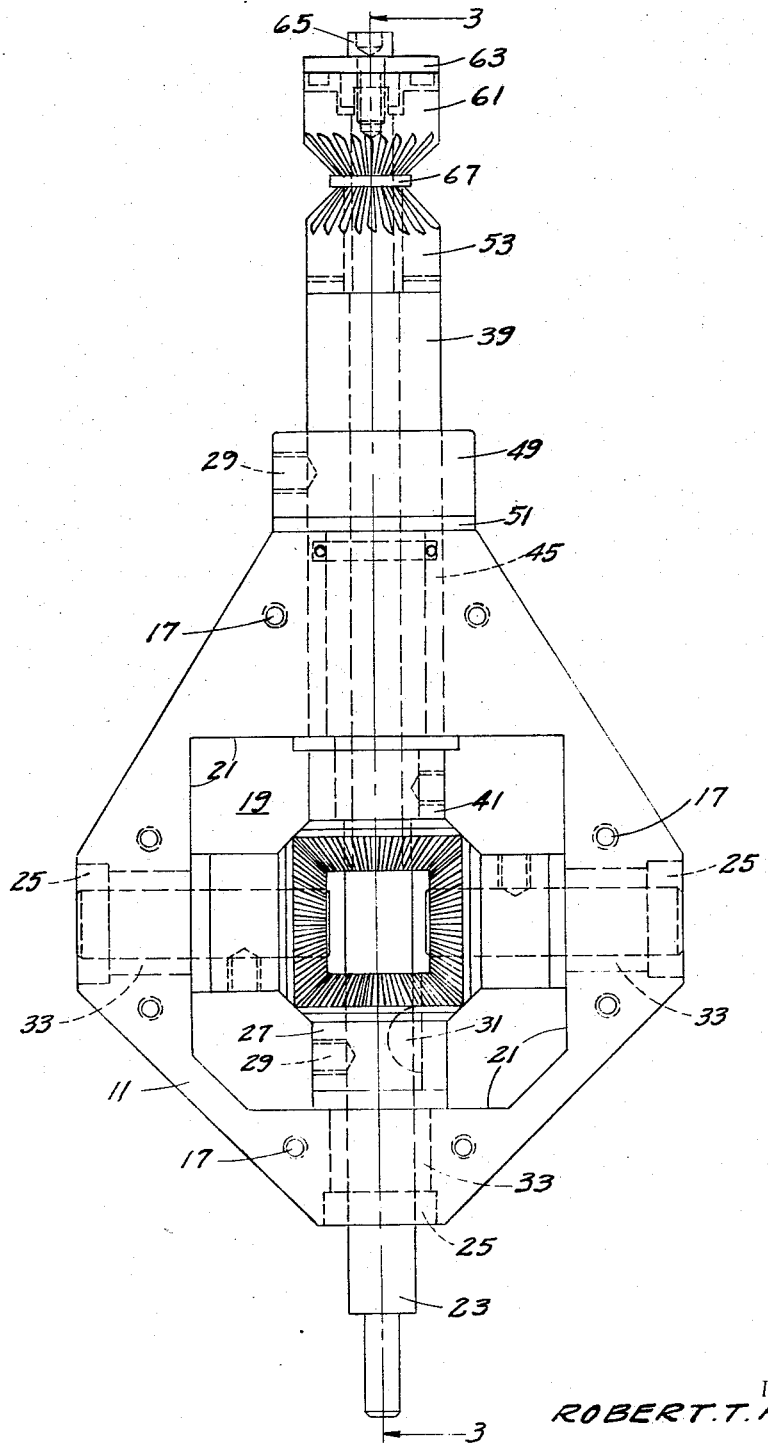

In the following is a discussion and description made with reference to the drawings whereon the same reference numerals are used to indicate the same or similar parts and/or structure. The discussion and description is of preferred specific embodiments of the new chamfering tool of the invention, and it is to be understood that the discussion and description is not to unduly limit the scope of the invention.

Referring now to the drawings, an elongated housing 11 has a width substantially greater than its thickness. A top cover 13 and a bottom cover 15 are rigidly mounted together on opposing sides of the housing 11 by screws 17. This forms a hollow portion 19 within the housing 11. This hollow portion 19 has four flat vertical opposing sides 21. These parts can be made of any suitable material such as metal or plastic or the like, but preferably of aluminum.

A power input shaft 23 is turnably mounted in the housing 11 projecting through each end thereof. A seal 25 is mounted in the input end portion of the housing 11 around the input shaft 23. This seal 25 can be made of any suitable sealing material such as fiber, rubber or the like but preferably of neoprene. A bevel gear 27 is rigidly mounted on the input shaft 23 in the hollow portion 19 of the housing 11. This gear 27 can be mounted by any suitable means but preferably by a set screw 29 and Woodruff key means 31.

A flange bushing 33 is mounted in the input end of the housing 11 by a light press fit and turnably engages the input shaft 23. The flange portion of the bushing 33 projects into the hollow portion 19 of the housing 11. One side of the flange engages the flat side 21 of the hollow portion 19 and the other side of the flange turnably engages the end portion of the bevel gear 27. The other end portion of the bushing 33 engages the seal 25. This flange bushing 33 can be made of any suitable friction reducing material but preferably of bronze.

Like transverse shafts 35 are opposedly mounted in the side portions of the housing 11 and project into the hollow portion 19. Like seals 25 are mounted in the side end portions of the housing 11 around each shaft 35. Like bevel gears 37 are rigidly mounted preferably by set screws on the inwardly projecting end portions of the transverse shafts 35. These gears 37 operably engage the input shaft gear 27. Like flange bushings 33 are similarly mounted in the side outside portions of the housing 11.

A hollow outside power shaft 39 is turnably mounted on the input shaft 23. This shaft 39 can be made of any suitable hard material such as plastic or metal but preferably of bronze. All of the other herinbefore mentioned shafts 23 and 35 are made of any suitable hard material such as metal, plastic or the like but preferably of steel drill rod. It is apparent that through the use of the dissimilar metals such as bronze and steel in the fabrication of the two shafts 23 and 39, a bearing situation exists between the two shafts allowing for a very close tolerance. It has been found in practice that very satisfactory results are obtained where the inside diameter of the outside shaft 39 is 5/1,000 an inch greater than the outside diameter of the input shaft 23 and preferably this differential can be 2/1,000 an inch. A fourth bevel gear 41 is rigidly mounted on the inwardly projecting end portion of the outside shaft 39 and operably engages the transverse gears 37. A set screw 29 is again preferably used to mount the gear 41 on the outside shaft 39.

An annular thrust washer 43 is engageably and turnably mounted on the outside shaft 39 between the fourth bevel gear 41 and a flat surface 21 of the housing 11. This washer 43 can be made of any friction reducing material such as metal, fiber or plastic but preferably of an oil impregnated porous bronze material. A sleeve bushing 45 is lightly pressed into the output end portion of the housing 11 and around the outside shaft 39, and has a similar tolerance as that between the outside shaft 39 and the input shaft 23. This sleeve bushing 45 can be made of any suitable hard material such as metal, plastic or the like but preferably of steel. An O-ring 47 preferably made of neoprene is mounted in an annular groove on the inside portion of the bushing 45 and provides an oil seal for the outside shaft 39. A thrust collar is rigidly mounted preferably by set screw means 29 on the projecting part of the outside shaft 39. Another thrust washer 51 is mounted between the trust collar 49 and the output end portion of the housing 11. This thrust washer 51 can be made of any suitable material such as metal, plastic, fiber or the like but preferably of an oil impregnated porous bronze material.

Lubrication is obtained for my tool by filling the hollow portion 19 in the housing 11 with a lubricant. This lubricant can be any suitable lubricating material such as grease, oil, plastic or the like but preferably a viscous transmission oil. The seals 25 and the O-ring 47 prevent the escape of lubricant from the hollow portion 19 of the housing 11. It has been found however that sufficient lubricant passes between the outside shaft 39 and the input shaft 23 to maintain satisfactory operating conditions between these oppositely rotating shafts.

Figure 2:
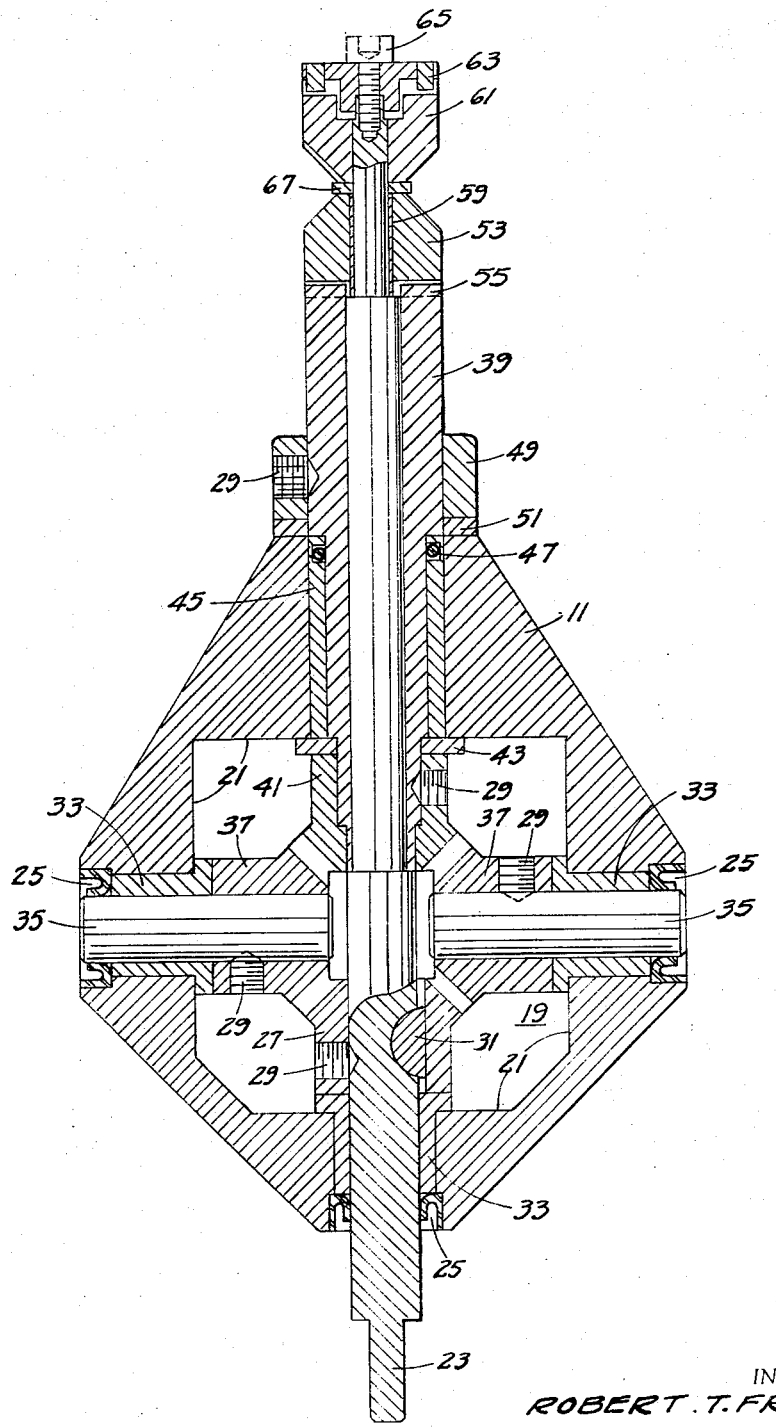
FIG. 2 is a longitudinal plan view of the preferred embodiment of my invention in cross section.
Figure 3:
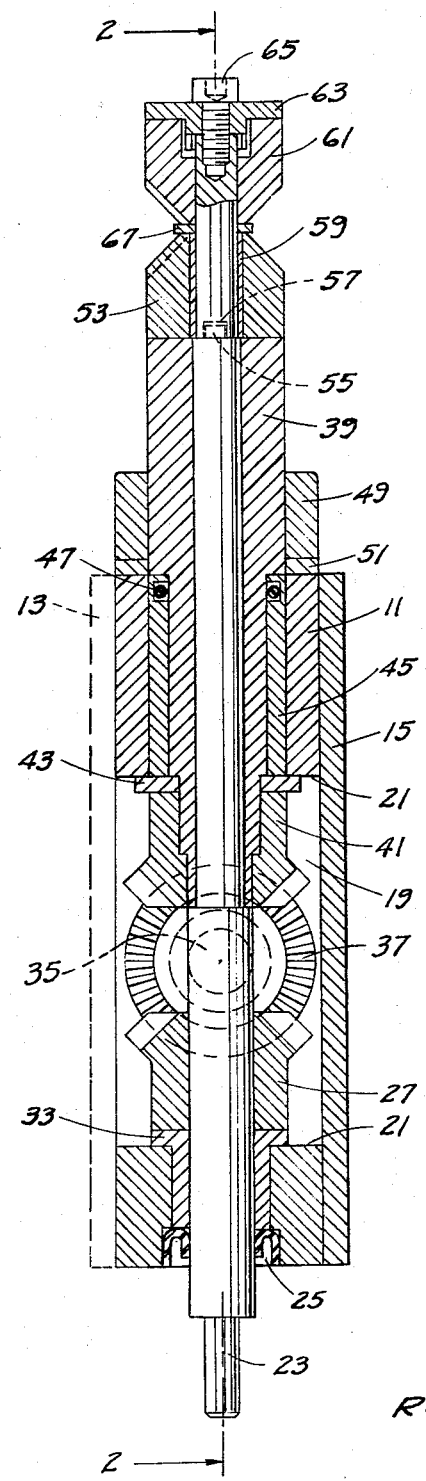
FIG. 3 is a cross sectional view taken on line 3—3 of FIG. 1.

Cutter means are mounted on the projecting ends of the input shaft 23 and the outside shaft 39. There are numerous specific embodiments of the cutter arrangements possible in my invention. A preferred arrangement is shown on FIGS. 1, 2, and 3 where a 45 degree chamfering head 53 is removably mounted on the projecting end portion of the input shaft 23. The projecting end portion of the outside shaft 39 has a transverse feather 55 along a diameter thereof and this feather engages a cooperating groove 57 in the end portion of the chamfering head 53. This provides a means for the outside shaft 39 to turn and drive the chamfering head 53. A lubricating sleeve bearing 59 is mounted on the input shaft 23 turnably engaging the chamfering head 53. This sleeve bearing 59 can be of any suitable lubricant impregnated material such as plastic, metallic or the like, preferably of an oil impregnated porous bronze material. Another 45 degree chamfering head 61 is removably mounted on the projecting end portion of the input shaft 23 in operably opposed relationship with the first cutter head 53. This chamfering head 61 is mounted on the end portion of the shaft 23 by a driver 63 which has a like diametrical feather which engages a cooperating diametrical groove on the chamfer head 61. The driver is secured to the shaft 23 by a screw 65.

Cutter heads are well known and are made in varying configurations such as those adapted to cut varying degrees of bevel, for cutting a radius, cutting a groove and so forth. They are also supplied in different materials such as high carbon steel, diamond impregnated cutting edges, tungsten steel and the like. It has been found that the Severance Tool Company of Saginaw, Michigan can make a very satisfactory cutter head for use on my invention.

In operation by tool is attached to a source of rotative power such as an electric drill or the like, the projecting end of the input shaft 23 being mounted in a chuck on a power source (not shown). The input shaft 23 rotates the bevel gear 27 mounted thereon and the driver 63 and cutter head 61 in one direction. The bevel gear 27 rotates the transverse gears 37 which in turn rotate the bevel gear 41 in the opposite direction which rotates the outside shaft 39 and the chamfering head 53 in a direction opposite from the direction of rotation of the chamfering head 61. A spacer ring 67 is turnably mounted between the heads 53 and 61. This specific embodiment of the invention is adapted to chamfer two edges of material simultaneously with an unchamfered portion the width of the spacer ring 67 remaining between the chamfered edges. It is easily seen that by the addition of additional spacer rings 67 the tool is easily adaptable to varying thicknesses of material and width of cut. The spacer ring also provides a guide for the tool along an edge of material, assuring a uniformity of cuts by the heads. The oppositely rotating cutter heads negate the thrust problems encountered in commonly used grinding tools and the like.

Another preferred specific embodiment of the invention is depicted at FIG. 4 and FIG. 6. In this embodiment a similar lubricating sleeve bearing 59 is mounted on the input shaft 23 outside of and adjacent to the cutter head 53. A roller bushing 71 is turnably mounted on the bearing 59 and a guide roller 69 is mounted on the bushing 71. The guide roller is adjustable in relation to the oppositely mounted cutter head 53 by sliding along the bushing 71 and being secured on the bushing at a perferred point by the set screw 73. In operation, the material to be cut rides on the bushing 71 and the extent of the cut is controlled by the adjustment of the guide roller 69 along the bushing 71. These figures also depict the embodiment of the invention wherein pins 75 instead of a feather can drivingly engage the driver to a cutter head 53 or guide roller 69. The tendency of the guide roller 69 and bushing 71 to rotate in the opposite direction from the rotation of the cutter head 53 has been found in ordinary cutting to adequately reduce the thrust of the cutter head 53.

FIGS. 5 and 7 show still another preferred specific embodiment of my invention which is particularly adapted to chamfer an inside edge of a piece of tubing or assembly or the like. As can be readily observed, the arrangement of FIG. 5 is the reverse of the arrangement of the FIG. 4 which is adapted to chamfer an outside edge. The cutter head 53 is mounted on the outside end portion of the input shaft 23 and the guide roller shaft is similarly mounted in the reverse position. In both arrangements it has been found advantageous to mount a relatively small spacer ring 67 in a recess in the bushing 71.

The materials used and the procedures employed in my tool are all in conformance with accepted shop and tooling practice except where otherwise noted.

The foregoing discussion and description has been made in connection with preferred specific embodiments of the chamfering tool of the invention. However, it is to be understood that the discussion and description is only intended to illustrate and teach those skilled in the art how to practice the invention, and such is not to unduly limit the scope of the invention, which is defined in the claims set forth hereinafter.

I claim:

1. A chamfering tool comprising, an elongated housing having a width substantially greater than its thickness, having a top cover and a bottom cover rigidly mounted together by screw means, and a hollow portion within said housing having flat vertical surfaces, a power input shaft turnably mounted in said housing and projecting therethrough, a seal mounted in the input end portion of said housing, said input shaft engageably and turnably projecting through said seal, and a bevel gear rigidly mounted by key means and set screw means on said input shaft, a flange bushing turnably mounted on said input shaft and in said input end portion of said housing, the flange portion of said bushing projecting into said hollow portion and engaging the end portion of the said bevel gear and a flat surface of said hollow portion, and the other end portion of said flange bushing engaging the said seal, a transverse shaft turnably mounted in one side portion of said housing, a seal mounted in an end portion of said side portion, an end portion of said transverse shaft engagingly and turnably projecting through said last-named seal, a second bevel gear rigidly mounted by set screw means on the other end portion of said transverse shaft, a like flange bushing turnably mounted on said transverse shaft and in said side portion of said housing, the flange portion of said bushing projecting into said hollow portion and engaging the end portion of said second gear and a side flat surface of said hollow portion of said housing, and the other end portion of said flange bushing engaging the said seal in said side portion, and said second bevel gear operably engaging the said first named bevel gear, another transverse shaft turnably and opposedly mounted in the other side portion of the said housing, a seal mounted in an end portion of the said other side portion of the said housing, an end portion of the said last-named transverse shaft engageably and turnably projecting through said last-named seal, a third bevel gear rigidly mounted by set screw means on the other end portion of said last-named transverse shaft, another like flange bushing turnably mounted on said last-named transverse shaft and in the other side portion of said housing, the flange portion of said bushing projecting into the said hollow portion and engaging the end portion of said third gear and the other side flat surface of the said hollow portion of said housing, and the other end portion of the said flange bushing engaging the said seal in the other of said side portion, and said third bevel gear operably engaging the first named bevel gear, a hollow outside power shaft turnably mounted in the output end portion of said housing, said input shaft turnably projecting through said outside shaft, a fourth bevel gear rigidly mounted by set screw means on said outside shaft in opposed relation to said first-named bevel gear and operably engaging the said second and third bevel gears, an annular thrust washer mounted on said outside shaft and turnably engaging a flat surface of said hollow portion in the output end portion of said housing, a bushing mounted in said output end portion of said housing, said outside shaft turnably projecting through said bushing, an O-ring mounted inside of and in an end portion of said bushing and engaging the said outside shaft, a thrust collar rigidly mounted by set screw means on the projecting end portion of said outside shaft, an annular thrust bearing turnably and engageably mounted between said collar and the outside portion of the output end portion of said housing, a cutter head removably mounted on the projecting end portion of said input shaft, the projecting end portion of said outside shaft having a transverse feather along a diameter thereof, said feather engageable with a cooperating groove on said cutter head to drive same, a lubricating bushing mounted on the projecting end portion of said input shaft, said lubricating bushing turnably engaging said input shaft and said cutter head, another cutter head removably mounted on the said projecting end portion of the said input shaft in operably opposed relationship with said first-named cutter head, a circular driver having a transverse feather along a diameter thereof engaging a cooperating groove on said last-named cutter head, said driver drivingly engaging said last-named cutter head and rigidly mounted on the projecting end portion of said input shaft by screw means, said chamfering tool constructed and adapted to rotate said adjacent cutter heads in opposite directions by a power means rotating said input shaft, said input shaft rotating the said first-named gear and the last-named cutter head in one direction, the said first-named gear rotating the said second and third gears, said second and third gears rotating the said fourth gear, said fourth gear rotating the said outside shaft, and said outside shaft rotating the said first-named cutter head in a direction opposite from the direction of rotation of the said last-named cutter head.

2. Chamfering tool as defined in claim 1 having at least one spacer ring turnably mounted on said input shaft between said cutter heads.

3. A chamfering tool comprising, a housing, a hollow portion within said housing, a power input shaft turnably mounted in said housing and projecting therethrough, a bevel gear rigidly mounted on said input shaft, a tranverse shaft turnably mounted in one side portion of said housing, a second bevel gear rigidly mounted on the inwardly projecting end portion of said transverse shaft, and said second bevel gear operably engaging the first-namer bevel gear, a like transverse shaft turnably and opposedly mounted in the other side portion of the said housing, a third bevel gear rigidly mounted on the inwardly projecting end portion of said last-named transverse shaft, and said third bevel gear operably engaging the first-named bevel gear, a hollow outside shaft turnably mounted on said input shaft in the output end portion of said housing, and projecting through same, seal means mounted on said shafts, said input shaft turnably projecting through said outside shaft, a fourth bevel gear rigidly mounted on said outside shaft in opposed relation to said first-named bevel gear and operably engaging the said second and third bevel gears, an annular thrust bearing flange turnably mounted on said outside shaft and engaging said housing, a bushing mounted in said output end portion of said housing, said outside shaft turnably projecting through said bushing, a thrust collar rigidly mounted on the projecting end portion of said outside shaft, an annual thrust bearing turnably and engageably mounted between said collar and said housing, a cutter head turnably and removably mounted on the end portion of the said input shaft projecting out of said outside shaft, a lubricating bushing turnably mounted on said input shaft and engaging said input shaft and said cutter head, the projecting end portion of said outside shaft having a transverse feather along a diameter thereof, said feather engaging a cooperating groove on said cutter head to drive same, another lubricating bushing turnably mounted on said projecting end portion of said input shaft, a guide bushing turnably mounted on said last-named lubricating bushing, a guide roller slidably and adjustably mounted on said guide bushing by set screw means, said guide roller mounted in operably opposed relationship with said cutter head, said chamfering tool constructed and adapted to rotate said cutter head with said guide roller free-wheeling to guide same, and said tool constructed and adapted to turn the said input shaft in a direction opposite from the rotation of the said outside shaft by a power means rotating said input shaft in one direction, said input shaft rotating the said first-named gear, said first-named gear rotating the said second and third gears, said second and third gears rotating the said fourth gear rotating the said outside shaft in an opposite direction.

4. A chamfering tool comprising, a housing, a hollow portion within said housing, a power input shaft turnably mounted in said housing and projecting therethrough, a bevel gear rigidly mounted on said input shaft, a transverse shaft turnably mounted in one side portion of said housing, a second bevel gear rigidly mounted on the inwardly projecting end portion of said transverse shaft, and said second bevel gear operably engaging the first-named bevel gear, a like transverse shaft turnably and opposedly mounted in the other side portion of the said housing, a third bevel gear rigidly mounted on the inwardly projecting end portion of said last-named transverse shaft, and said third bevel gear operably engaging the first-named bevel gear, a hollow outside shaft turnably mounted on said input shaft in the output end portion of said housing, and projecting through same, seal means mounted on said shafts, said input shaft turnably projecting through said outside shaft, a fourth bevel gear rigidly mounted on said outside shaft in opposed relation to said first-named bevel gear and operably engaging the said second and third bevel gears, an annular thrust bearing flange turnably mounted on said outside shaft and engaging said housing, a bushing mounted in said output end portion of said housing, said outside shaft turnably projecting through said bushing, a thrust collar rigidly mounted on the projecting end portion of said outside shaft, an annular thrust bearing turnably and engageably mounted between said collar and said housing, a lubricating bushing turnably mounted on the end portion of said input shaft projecting out of said outside shaft, a guide bushing turnably mounted on said lubricating bushing, a guide roller slidably and adjustably mounted on said guide housing, and said guide bushing turnably engaging the projecting end portion of said outside shaft, a cutter head removably mounted on said projecting end portion of said input shaft in operably opposed relationship with the said guide roller, a circular driver having a transverse feather along a diameter thereof engaging a cooperating groove on the said cutter head, said driver drivingly engaging said cutter head and rigidly mounted on the projecting end portion of said input shaft by screw means, said chamfering tool constructed and adapted to rotate said cutter head, said guide roller and guide bushing guiding same along work being chamfered, and said tool constructed and adapted to turn the said input shaft in a direction opposite from the rotation of the said outside shaft by a power means rotating said input shaft in one direction, said input shaft rotating the said first-named gear, said first-named gear rotating the said second and third gears, said second and third gears rotating the said fourth gear rotating the said outside shaft in an opposite direction.

5. The device as defined in claim 3 having at least one spacer ring turnably mounted on said input shaft between said cutter head and said guide roller.

6. The chamfering tool as defined in claim 4 having at least one spacer ring turnably mounted on said input shaft between said cutter head and said guide roller.

7. A chamfering tool comprising, a housing, a hollow portion within said housing, a power input shaft turnably mounted in said housing and projecting therethrough, a gear mounted on said input shaft to turn therewith, a transverse shaft mounted in said housing, a second gear mounted on said transverse shaft, and said second gear operably engaging the first-named gear, a hollow outer shaft turnably mounted on said input shaft in the output end portion of said housing, and projecting through same, said input shaft turnably projecting through said outer shaft, a third gear mounted on said outer shaft to turn therewith and in opposed relation to said first-named gear and operably engaging said second gear, a cutter head mounted on the projecting end portion of said input shaft, the projecting end portion of said outer shaft having connecting means thereon, said cutter head having cooperating connecting means thereon, and the connecting means on said outer shaft and said cutter head engageable to drive said cutter head, another cutter head removably mounted on said projecting end portion of said input shaft in operably opposed relationship with said first-named cutter head, a driver mounted on an end portion of said projecting end portion of said input shaft to turn therewith and having connecting means thereon, said last-named cutter head having cooperating connecting means thereon, and said connecting means on said driver and said last-named cutter head drivingly engaged to drive said last-named cutter head, said chamfering tool constructed and adapted to rotate said adjacent cutter heads in opposite directions by a power means rotating said input shaft, said input shaft rotating said first-named gear and the last-named cutter head in one direction, with said first-named gear rotating the said second and third gears, said third gear rotating said outer shaft, and said outer shaft rotating said first-named cutter head in a direction opposite from the direction of rotation of said last-named cutter head.

8. A chamfering tool comprising, a housing, a hollow portion within said housing, a power input shaft turnably mounted in said housing and projecting therethrough, a gear mounted on said input shaft to turn therewith, a transverse shaft mounted in said housing, a second gear mounted on said transverse shaft, and said second gear operably engaging the first-named gear, a hollow outer shaft turnably mounted on said input shaft in the output end portion of said housing, and projecting through same, said input shaft turnably projecting through said outer shaft, a third gear mounted on said outer shaft to turn therewith and in opposed relation to said first-named gear and operably engaging said second gear, a cutter head mounted on the projecting end portion of said input shaft, the projecting end portion of said outer shaft having connecting means thereon, said cutter head having cooperating connecting means thereon, and the connecting means on said outer shaft and said cutter head engageable to drive said cutter head, a guide roller mounted on said projecting end portion of said input shaft in operably opposed relationship with said cutter head, said chamfering tool constructed and adapted to rotate said cutter head with said guide roller free-wheeling to guide same, and said input shaft rotating said first-named gear, with said first-named gear rotating the second and third gears, and said third gear rotating said outer shaft.

9. A chamfering tool comprising, a housing, a hollow portion within said housing, a power input shaft turnably mounted in said housing and projecting therethrough, a gear mounted on said input shaft to turn therewith, a transverse shaft mounted in said housing, a second gear mounted on said transverse shaft, and said second gear operably engaging the first-named gear, a hollow outer shaft turnably mounted on said input shaft in the output end portion of said housing, and projecting through same, said input shaft turnably projecting through said outer shaft, a third gear mounted on said outer shaft to turn therewith and in opposed relation to said first-named gear and operably engaging said second gear, a guide roller turnably mounted on said projecting end portion of said input shaft, a cutter head mounted on said projecting end portion of said input shaft in operably opposed relationship with said guide roller, a driver mounted on an end portion of said projecting end portion of said input shaft to turn therewith and having connecting means thereon, said cutter head having cooperating connecting means, and said connecting means on said driver and said cutter head drivingly engaged to drive such cutter head, said chamfering tool constructed and adapted to rotate said cutter head, said guide roller guiding said cutter head along work being chamfered, said input shaft rotating said first-named gear and said cutter head in one direction, with said first-named gear rotating the said second and third gears, and said third gear rotating said outer shaft.

References Cited by the Examiner

UNITED STATES PATENTS 2,929,299  3/1960  Jenkins _____ 90—12

WILLIAM W. DYER, Jr., *Primary Examiner.*

G. A. DOST, *Assistant Examiner.*